UNITED STATES PATENT OFFICE.

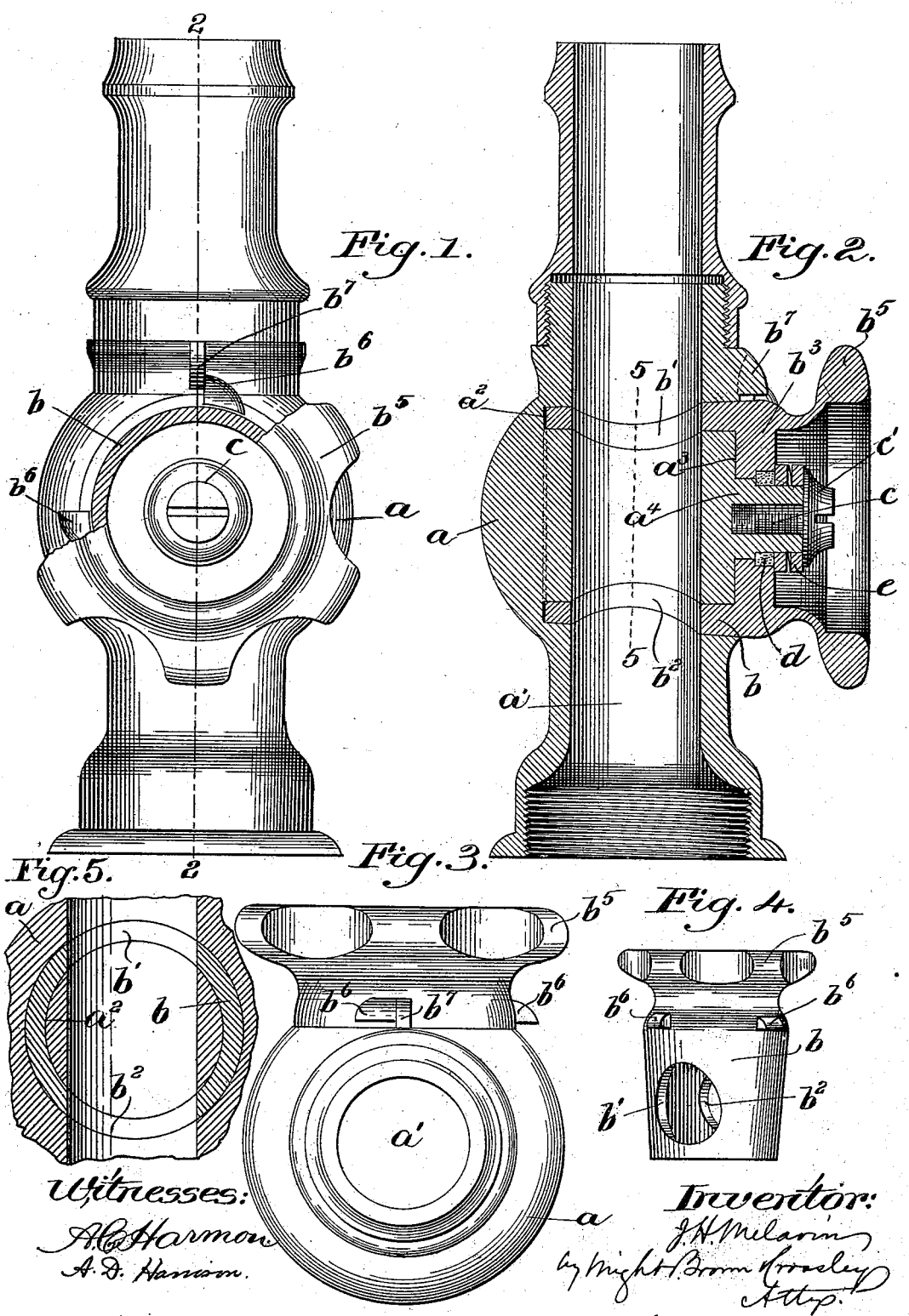

JOHN H. MELAVIN, OF CAMBRIDGE, MASSACHUSETTS.

SHUT-OFF VALVE FOR HOSE-NOZZLES.

SPECIFICATION forming part of Letters Patent No. 534,751, dated February 26, 1895.

Application filed March 26, 1894. Serial No. 505,083. (No model.)

*To all whom it may concern:*

Be it known that I, JOHN H. MELAVIN, of Cambridge, in the county of Middlesex and State of Massachusetts, have invented certain new and useful Improvements in Shut-Off Valves for Hose-Nozzles, of which the following is a specification.

This invention has for its object to provide a simple and effective shut-off valve, adapted to readily open and close the bore of a hose nozzle and to be kept in a satisfactory working condition, with automatic compensation for wear.

To these ends, the invention consists in the improvements which I will now proceed to describe and claim.

Of the accompanying drawings, forming part of this specification,—Figure 1 represents a side elevation of a hose nozzle provided with my improvements, a part of the valve being broken away. Fig. 2 represents a section on line 2—2 of Fig. 1. Fig. 3 represents an end view. Fig. 4 represents a view of the valve on a smaller scale, removed from the nozzle. Fig. 5 represents a section on line 5—5 of Fig. 2.

The same letters of reference indicate the same parts in all the figures.

In the drawings—$a$ represents the main portion or body of my improved hose nozzle, the same being provided with the bore $a'$. In the body $a$ is formed an annular socket $a^2$ extending from one side of the nozzle across the bore, and terminating within the opposite side, as shown in Fig. 2. The inner wall of said socket is preferably of uniform diameter, the outer wall being tapering and larger at the open end of the socket than at the closed end, said outer wall constituting a tapering valve seat intersecting the bore of the nozzle.

$b$ represents an annular valve formed to closely fit the socket $a^2$, said valve being of uniform diameter from end to end on its inner face, and having a tapering outer face formed to closely fit the said valve seat. The valve has ports $b'$ $b^2$, which in the open position of the valve coincide with the bore of the nozzle, and in the closed position of the valve are located wholly between the walls of the socket at opposite sides of the bore.

The nozzle is provided with a flat seat or face $a^3$ at the outer end of the socket, and from the center of said face projects a stud $a^4$ which has an internally-threaded socket formed to receive a screw $c$ having an enlarged head $c'$.

The valve $b$ has a head $b^3$ formed to bear closely against the flat seat $a^3$ of the nozzle, said head having a central orifice through which the stud $a^4$ passes. The head $b^3$ and the stud $a^4$ are both recessed, as shown in Fig. 2, to receive a compressible packing ring $d$ which may be of leather or other suitable compressible material.

$e$ represents a spring which is interposed between the screw-head $c'$ and the outer surface of the head $b^3$, said spring bearing also upon the packing ring $d$. It will be seen that the spring $e$ is supported by the screw-head $c'$, the latter being rigidly secured to the nozzle, and therefore exerts an inward pressure on the valve, tending to force the tapering external surface thereof against the correspondingly tapering seat in the nozzle, so that as the valve wears away the wear is compensated for by the spring, the socket being made enough deeper than the length of the valve to permit a sufficient inward movement of the valve to compensate for wear. The inward pressure of the spring also compresses the packing ring $d$, and thus maintains a tight joint between the head $b^3$ and the stud $a^4$, preventing leakage at said joint.

It will be seen that the tapering form of the valve makes the walls of the ports $b'$ $b^2$ of gradually decreasing thickness, said walls being thickest near the outer end of the valve and gradually decreasing in thickness toward the inner end. This variation in thickness causes the water pressure when the valve is open to act outwardly or against the inward pressure of the spring $e$, thus making it easy to turn the valve and shut off the water.

When the valve is closed, there is no pressure on the walls of the ports, and the spring $b$ can then act without opposition to hold the valve closely against its seat, thus maintaining a tight joint.

The valve is provided with a handle $b^5$ and with stop lugs $b^6$ $b^6$ which abut against a lug $b^7$ on the nozzle, said lugs limiting the movements of the valve in each direction.

I do not limit myself to the employment of the screw $c$ and its head $c'$, as I may substitute for said head any other suitable shoulder or engagement which may be secured to or formed on the stud $a^4$ and serve to support the spring $e$.

It will be seen that the annular socket forms a core containing a part of the bore of the nozzle, said core being integral with the body of the nozzle. This construction does away with a fastening screw at the end of the valve opposite the handle, the body of the nozzle being entirely closed at that point. The core also fills the interior of the valve, so that a part of the bore of the nozzle is within the valve, and presents a smooth fixed water way through the valve, co-operating with the ports in the casing and annular valve in forming a practically continuous passage.

I claim—

1. A hose nozzle having an annular tapering socket intersecting its bore the outer wall of said socket constituting a tapering valve seat, combined with an annular tapering valve fitting said seat and provided with ports which in the open position of the valve coincide with the bore of the nozzle, and a spring which presses the tapering periphery of the valve inwardly against the tapering seat, the walls of said ports being of gradually decreasing thickness so that the water exerts an outward pressure on the valve, as set forth.

2. A hose nozzle having an annular tapering socket intersecting its bore, the outer wall of said socket constituting a tapering valve seat while its inner wall terminates in a face having a projecting stud, combined with an annular tapering valve formed to fit said socket and face and provided with an orifice to receive said stud, and a spring interposed between the valve and a shoulder on the outer end of the stud, said spring exerting an inward pressure on the valve, as set forth.

3. A hose nozzle having an annular tapering socket intersecting its bore, the outer wall of said socket constituting a tapering valve seat while its inner wall terminates in a face having a projecting stud, combined with an annular tapering valve formed to fit the socket and having a head through which the said stud passes, a compressible packing surrounding the stud and contained in a recess in the valve head, and a spring interposed between the head and a shoulder on the outer end of the stud, said spring acting not only to press the valve inwardly but also to compress said packing and prevent leakage around the stud.

4. A hoze nozzle having an annular socket extending from one side of the nozzle partly to the other side and forming a core through which the bore of the nozzle passes, said core being integral with the nozzle, combined with an annular valve fitting said socket and having ports, which in the open position of the valve coincide with the bore of the nozzle.

5. A hose nozzle comprising an annular valve provided with ports or passages at diametrically opposite points, a casing surrounding said valve and having corresponding ports or passages and a core within the valve having a single passage, the ports in the casing, valve, and core constituting a straight, practically continuous, smooth-walled passage when the valve is open.

In testimony whereof I have signed my name to this specification, in the presence of two subscribing witnesses, this 22d day of March, A. D. 1894.

JOHN H. MELAVIN.

Witnesses:
C. F. BROWN,
A. D. HARRISON.